April 15, 1969   W. A. KASPER   3,438,597
AIRCRAFT
Filed April 3, 1967   Sheet 1 of 2
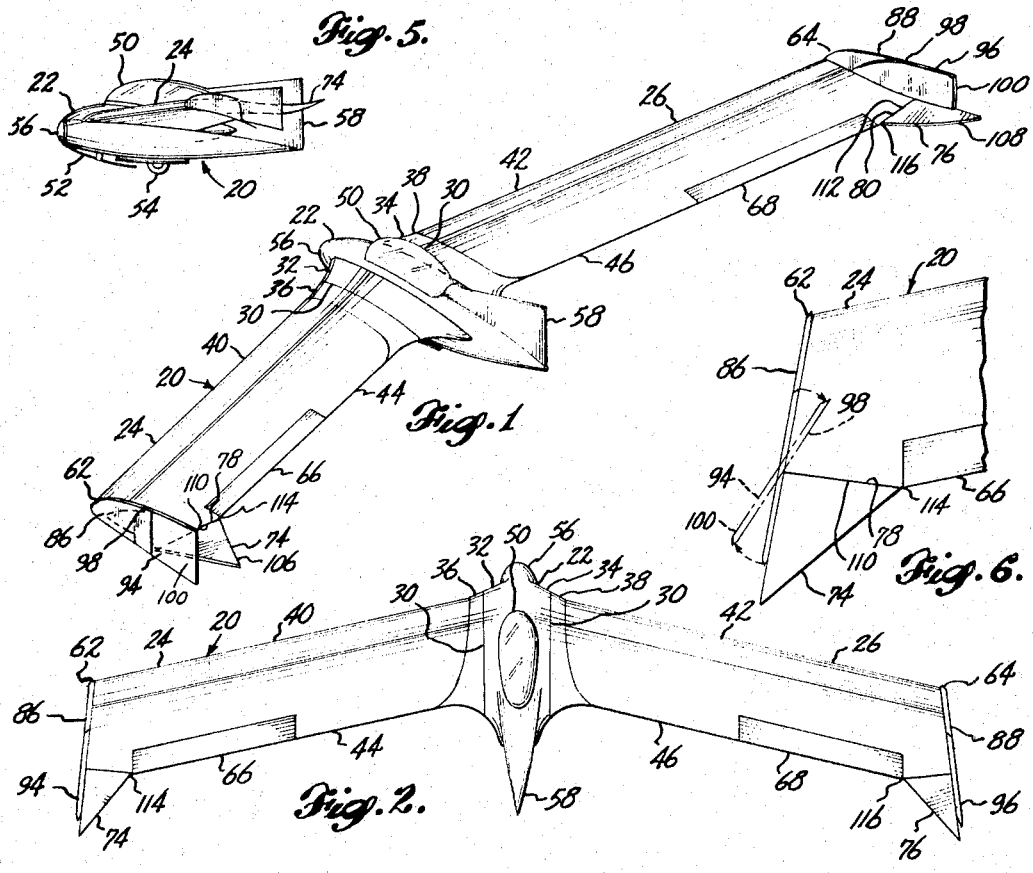
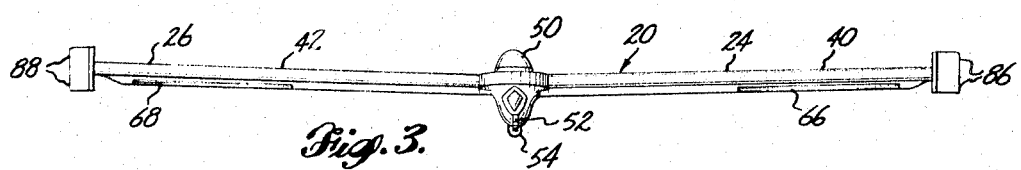
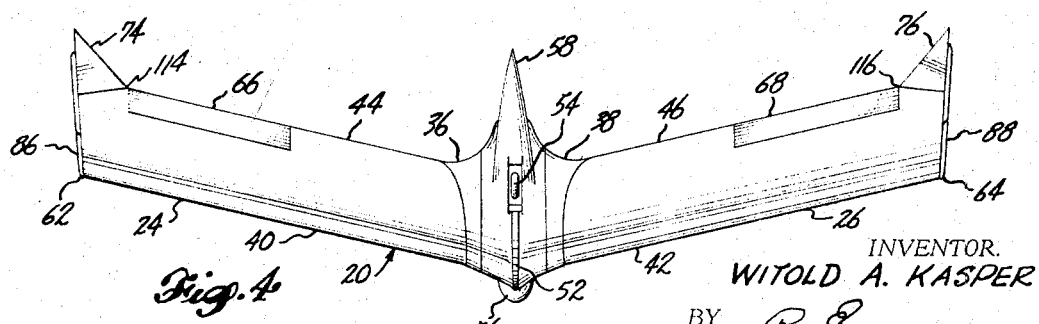
INVENTOR.
WITOLD A. KASPER
BY Roy Mattern Jr.
ATTORNEY

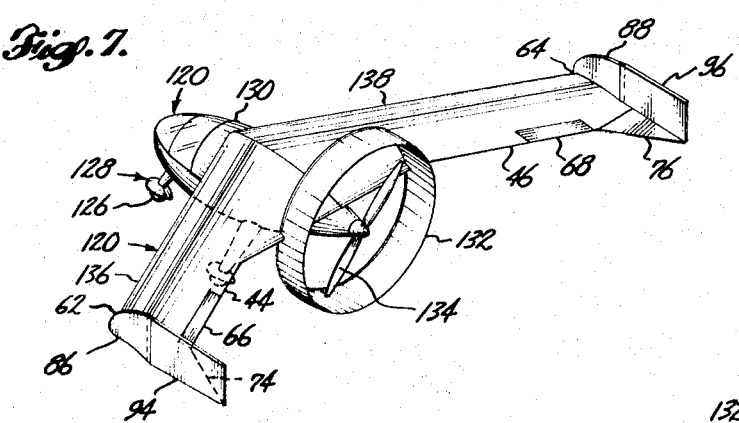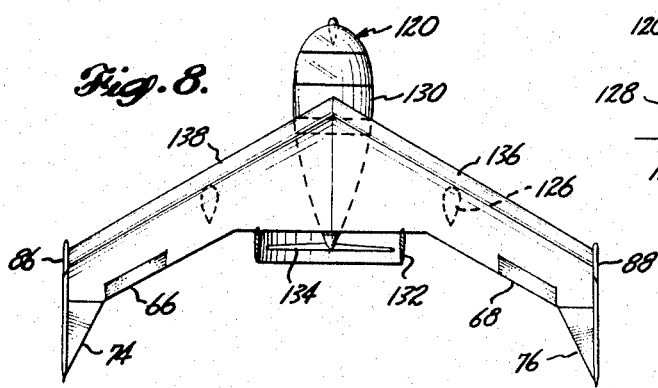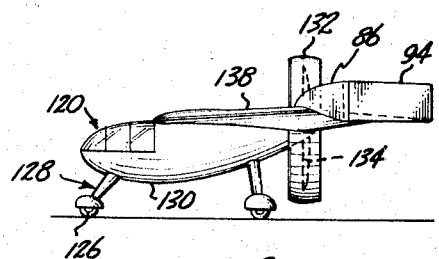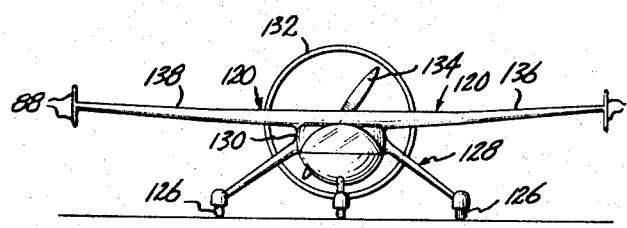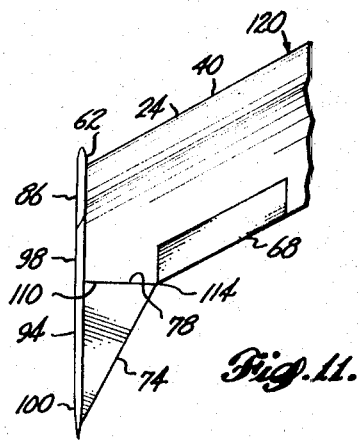

United States Patent Office 3,438,597
Patented Apr. 15, 1969

3,438,597
AIRCRAFT
Witold A. Kasper, 1853 132nd SE.,
Bellevue, Wash. 98004
Filed Apr. 3, 1967, Ser. No. 628,127
Int. Cl. B64c 1/50, 5/08, 9/00
U.S. Cl. 244—13     11 Claims

ABSTRACT OF THE DISCLOSURE

An aircraft for powered and non-powered flight has an arrangement of its entire aerodynamic controls mounted essentially on the trailing edges at and near wing tips of swept back wings which extend outwardly and rearwardly from a fuselage to position such controls so there is no additional requirement to extend such fuselage beyond the approximate width of such swept back wings for the sole purpose of supporting one or more aerodynamic controls, thereby resulting in an aircraft that is fully controllable, even in intentionally induced tumbling, which has superior flight characteristics in all aspects of flight in comparison to aircraft having extended fuselages or other structures to support one or more aerodynamic controls at the rear of the fuselage.

These aerodynamic controls which are all mounted essentially on the trailing edges at and near the wing tips are: horizontal stabilizers serving optionally in emergencies as elevators; elevons acting as elevators and/or ailerons; vertical stabilizers extending above and below the wing tips and optionally positioned inwardly to increase directionally stability and at all times serving as end plates; rudders essentially aligned with the vertical stabilizers to continue the end plate functions when aligned and then to operate independently of one another for directional control, and each rudder having portions positioned forward of their mounting which are pivotable over the wing, ahead of the stabilizers to act independently of one another as spoilers also creating an aileron effect and to act together also serving as air brakes.

PURPOSE OF THE INVENTION

During flight of most aircraft which generally have one or more aerodynamic controls positioned at the rear of an extended fuselage either on the center line or offset thereto or positioned on equivalent structure, considerable aerodynamic drag is created by such extending structures and the control surfaces, the latter often being made larger to cope with disturbed air flows and such size increase creates additional drag.

Therefore, it is the purpose of this invention to provide an aircraft wherein there is no need to extend the fuselage or to provide equivalent structure to support one or more of such rearwardly positioned aerodynamic controls. Instead this invention positions all aerodynamic controls on the trailing edges at and near the wing tips of swept back wings, thereby substantially reducing the aerodynamic drag and providing many duplicate ways to effect desirable aerodynamic control forces to guide the aircraft in its flight.

ILLUSTRATED EMBODIMENTS OF THE INVENTION

On the first page of the accompanying drawings, an aircraft which is non-powered is shown. On the second page an aircraft which is powered is shown.

In these drawings:

FIGURE 1 is a perspective view of the non-powered gliding aircraft;

FIGURE 2 is a top view of the gliding aircraft of FIGURE 1;

FIGURE 3 is a front view of the gliding aircraft of FIGURE 1;

FIGURE 4 is a bottom view of the gliding aircraft of FIGURE 1;

FIGURE 5 is a side view of the gliding aircraft of FIGURE 1;

FIGURE 6 is an enlarged view of the wing tip and nearby trailing edge mounted aerodynamic controls of the gliding aircraft of FIGURE 1;

FIGURE 7 is a perspective view of the powered aircraft;

FIGURE 8 is a top view of the powered aircraft of FIGURE 7;

FIGURE 9 is a front view of the powered aircraft of FIGURE 7;

FIGURE 10 is a side view of the powered aircraft of FIGURE 7; and

FIGURE 11 is an enlarged view of the wing tip and nearby trailing edge mounted aerodynamic controls of the powered aircraft of FIGURE 7.

NON-POWERED GLIDING AIRCRAFT SPECIFICATIONS

The non-powered gliding aircraft 20 illustrated in FIGURES 1 through 6, in an embodiment has the following general specifications:

(1) Span _____ feet__ 39
(2) Length _____ 10 ft. 10 in.
(3) Area _____ sq. ft__ 155
(4) Aspect ratio _____ 10
(5) Sweep back _____ degrees__ 13
(6) Washout _____ do____ 4
(7) Empty weight _____ lbs__ 370
(8) Gross weight _____ lbs__ 570
(9) Wind loading _____ lbs. per sq. ft__ 2.36
(10) Sinking speed _____ ft. per sec__ 2.36
(11) Max. L/D _____ 35.0
(12) Stabilizers and flight controls located at wing tips.

GENERAL ARRANGEMENT

As illustrated in FIGURES 1 through 6, gliding aircraft 20 has a fuselage 22 serving as the structural center of this aircraft. The swept-back wings 24, 26 are hinge and pin mounted (not shown) to fuselage 22 along parting line 30. The fuselage is contoured at 32, 34 on both sides down to this parting line location. The wing structures 36, 38, located immediately on both sides of the aircraft by the parting line are especially contoured being full and rounded at the wing leading edges 40, 42 and flaring into thinner wing trailing edges 44, 46 which enhances favorable air flow by the fuselage and wings at this critical location.

The fuselage 22 also serves as the seating place of a pilot below canopy 50, as the mounting place of a landing skid 52 and wheel 54, as the securing place of a selective weight nose section 56, and as the support of the integrally arranged faired and tapered trailing fin 58 which improves air flow by fuselage 22.

The swept back wings 24, 26 as they extend outwardly from their transition structures 36, 38 are preferably of uniform width. As wing tips 62, 64 are approached, elevons 66, 68 are pivotally mounted on the wings within their overall contours forming part of the trailing edges. The horizontal stabilizers 74, 76 are pivotally secured to a narrowing wing section 78, 80 immediately adjacent elevons 66, 68 on one side and wing tips 62, 64 on their other side. Then on wing tips 62, 64 themselves are mounted vertical stabilizers 86, 88 which also serve as endplates. These stabilizers 86, 88 are preferably mounted with a slight toe in for added directional stability. Also aligned with these vertical stabilizers 86, 88 are balanced rudders 94, 96 pivotally mounted to wing tips 62, 64. These rudders 94, 96 serve additional functions as endplates, spoilers and air brakes. More information concerning all these controls is presented in the following discussion of controls and their operations and also in a discussion of flight characteristics of this aircraft.

AERODYNAMIC CONTROLS

The last general specification indicates the combination of all aerodynamic controls occurs in left and right groups located specifically at swept back wing tips 62, 64 or nearby on trailing edges 44, 46.

In each of these wing tip groups there are:

Vertical stabilizers 86, 88 mounted at each wing tip 62, 64 optionally may have a "toe-in" if the sweep back angle is small, for added directional stability. These vertical stabilizers 86, 88 extend above and below wing tips 62, 64 forming an endplate which increases the effectiveness of elevons 66, 68 and horizontal stabilizers 74, 76.

The rudders 94, 96 mounted at each wing tip 62, 64 continue the endplate configuration during straight away flight. Each rudder 94, 96 has a forward pivotal or balancing portion 98 which because of its overlapping contact with a vertical stabilizer 86, 88 is deflectable only in an inboard direction. When so pivoted, it spoils the lift at the wing tip and induces desired braking. This forward portion 98 of each rudder in moving over the wing but ahead of the respective stabilizer spoils the aerodynamic effectiveness of the stabilizer. In straightaway flight each stabilizer 74, 76 is pivoted slightly upwardly to create a pitch up moment, the pivoted position being shown in FIGURE 5.

Each rudder 94, 96 has its rear pivotal portion 100 which deflects outboard to create a turning force which is supplemented in the desired directional change as the wing lift is spoiled by the forward portion 98 of the rudder. Movement of one rudder causes a perfectly coordinated turn of the gliding aircraft 20 without any requirement for effective aileron action by use of an elevon 66 or 68. Such movement of the rudder is akin to a servo function. Movement of both rudders 94, 96 simultaneously converts their rudder actions first to spoiler actions and then after full deflection operationally converts the rudders 94, 96 into effective air brakes. Where only one rudder is being used initially in a turn, the other rudder may be used subsequently to create a counter force to slow up the turning rate.

The rudders 94, 96 in combining with the vertical stabilizers 86, 88 when aligned, with or without a toe in, during straight flight as endplates reduce the wing tip induced drag, act as air stream guides over the outboard portion of the swept wing, and as a result of directing the air stream increase the effectiveness of elevons 66, 68 and horizontal stabilizers 74, 76.

Horizontal stabilizers 74, 76 are mounted on the trailing edges 44, 46 of the swept back wings 24, 26 on their narrowing sections 78, 80 near the wing tips 62, 64 and just inboard of the rudders 94, 96. They are trimmed by pivoting them either by direct manipulation before flight or movement during flight using cockpit controls to match their effect to the effects of the possible changes in the position of the center of gravity. Also their independent adjustment with respect to one another permits lateral trimming in flight. Under straight away flight conditions, both horizontal stabilizers 74, 76 are pivoted upwardly creating an overall reflex airfoil and consequently a moment of aerodynamic force which tends to pitch the aircraft upwardly. This upward pitching moment welcomely opposes the downward pitching moment of the aircrafts weight about its center of gravity. Although this desirable upward pitching moment is reduced and/or lost when a respective forward portion of a rudder pivots over a wing ahead of the stabilizer, the resulting forward shift of the center(s) of pressure along the wing(s) occurs immediately to restore equilibrium.

When only one rudder is moved, it operates also in a servo function way by spoiling the lift over the adjacent wing area and stabilizer. Yet the turn is a very controllable turn as the center of pressure along the respective swept wingside moves forward.

In emergencies these horizontal stabilizers 74, 76 are used functionally as effective elevators. Because of their wing tip location they are subjected to the air stream acceleration effect derived from endplates formed by vertical stabilizers 86, 88 and rudders 94, 96. In addition their preferable angular taper 106, 108, producing their triangular shape, reduces wing tip turbulence. Their effectiveness in such location results in their total surface area being about 75% less than surfaces of centered tail stabilizers of most other types of aircraft.

As noted previously, as wing tips 62, 64 are approached, swept wings 24, 26 have a narrowing wing section 78, 80. This is undertaken principally to position the horizontal stabilizers pivotal axes 110, 112 on a bias with the trailing wing edges in order to position pivotal axis 110 of the horizontal stabilizer 74 perpendicular to the geometric plane of rudder 94 and to position pivotal axis 112 of horizontal stabilizer perpendicular to the geometric plane of rudder 96. Such a mounting insures that during movements of horizontal stabilizers 74, 76, they will remain clear of rudders 94, 96 which are restrained from pivoting directly over the stabilizer. Also it is to be noted, these axes of horizontal stabilizers terminate at their inboard ends 114, 116 immediately adjacent outboard trailing edge corners of elevons 66, 68. This construction eliminates formation of any aerodynamic gaps at these wing locations which might otherwise be caused by horizontal stabilizer movements occurring so closely to elevons 66, 68.

Elevons 66, 68 are formed as pivotable but integral appearing portions of swept back wings 24, 26 and in such position immediately inboard of horizontal stabilizers 74, 76 they do not add drag to aircraft 20 beyond the drag of the overall wings. These elevons 66, 68 are rotated together to perform elevator functions and rotated oppositely to perform aileron functions. In a full attempted stall, deflection of elevons together gives wings 24, 26 a high nose-up moment. As a result stall characteristics are described as gentle. So gentle in fact, the aircraft 20 really cannot be effectively stalled. Instead it mushes without any tendency to fall off on one wing. The elevons 66, 68 as will be discussed later again, are employed in inducing controlling and stopping tumbling of aircraft 20.

FLIGHT CHARACTERISTICS

Tumbling, a flight characteristic generally not desired except for aerobatics, is a flying condition of aircraft occurring when wings in their sequential movement generate an observed conical pattern, with wing tips maintaining the highest air speed. Because of this high wing tip airspeed, all these wing tip grouped controls remain fully effective. Depending on the forward or backward direction of the tumbling motion, the elevon-elevator moment is added or subtracted from the moment of inertia, thus damping or increasing the rate of tumbling as desired by the pilot.

Spinning is induced with a dynamic stall brought about with a full rudder movement combined with an opposite positioning of the aileron. The spin is nearly vertical and at a constant speed of 70 miles per hour in the illustrated non-powered gliding aircraft 20. Recovery from such a spin is accomplished within ¼ of a turn after releasing the aforementioned controls to their neutral position.

Longitudinal stability in the non-powered embodiment 20, is unusually high and is higher than normally encountered in other aircraft. Complete attenuation of a longitudinal disturbance takes place within one-half of a cycle. In the aircraft flight of this first embodiment reasonable shifts in the center of gravity did not effect the aircraft's longitudinal stability.

Longitudinal stability of the aircraft described herein has no equivalent in any tail equipped comparable airplane. The principal difference between this aircraft's stability and the stability of a conventional airplane lies in the manner longitudinal stability is obtained. A conventional airplane is *dynamically stable,* that is a displacement from a given attitude in flight sets up forces and moments which tend to restore the original attitude gradually, through a series of attenuating oscillations. This aircraft, on the other hand, when displaced from a given attitude, as by a gust of wind, returns to the original attitude with practically no oscillation. The reason for this decisive reaction is the somewhat different principle of stability: an equilibrium of moments.

The balancing moments are the pitch-up moment produced by the reflex profile of the wing and the pitch-down moment produced by the wing sweep. Thus when a gust displaces this aircraft by partially reducing one of the balancing moments, the other moment automatically increases in the direction opposite to that of the disturbance. For example, a gust produces a pitch-up effect: this reduces the profile pitch-up moment, increases the lift, increases the pitch-down moment of the swept wing, the aircraft returns to the original attitude where the pair of the opposite moments is again in equilibrium and the movement stops.

The above phenomenon is not related to the center of gravity position therefore this *autostability* is constant.

THE RELATION OF THE CENTER OF GRAVITY AND CENTER OF PRESSURE LOCATIONS

Every position of the center of gravity has a corresponding angle of the horizontal stabilizers located at the tips of the moderately swept back wing and adjustable in flight. A forward shift of the center of gravity is counteracted by an upward adjustment of the stabilizers while a downward adjustment of the stabilizer compensates for an aft shift of the center of gravity.

Now, an upward displacement of the stabilizers (to compensate for the forward center of gravity shift) also reduces the wing lift at the tips, causing the center of pressure to move inboard and therefore forward. A downward stabilizer displacement has a directly opposite effect on the center of pressure travel. Thus, the center of pressure travels automatically in the direction of the center of gravity shift, maintaining approximately a constant distance from each other. This makes it impossible to place the center of gravity at or behind the center of pressure within the displacement range of the stabilizers. Furthermore, the elevon displacement also causes a corresponding center of pressure travel, increasing the center of pressure—center of gravity distance.

As can be seen, this center of pressure—center of gravity relationship permits a far greater safe range of center of gravity positions than is possible in a conventional airplane configuration.

Longitudinal control

The "autostability" of the illustrated and described aircraft of this invention results in a slightly different technique of applying the elevons. Since a displacement of the elevons immediately and automatically produces a positive stabilizing reaction which tends to maintain the new attitude, a loop, for example, has to be carefully and steadily controlled throughout the maneuver as the pitch-up moment must be continuously reintroduced by an ever increasing elevon "up" displacement.

Directional stability and control

The flow fences at the wingtips serve as directional stabilizers. The forward part remains stationary while the aft part is hinged and acts as a rudder. Both fences (and rudder in closed, flush, position) are toed in for added directional stability. This toe-in effect can be increased and varied at will since the rudders are operated independently of each other.

In closed (flush) position, the rudders and the forward directional stabilizers/fences become large endplates which reduce induced drag. When displaced (only an outward displacement is possible), the rudder's aerodynamic balance (forward of the fulcrum) reduces the lift on the wing thus causing banking in the direction of the turn. At the same time, the corresponding horizontal stabilizer also being blanked out reduces its pitch up moment with the resulting desirable slight pitch down.

The independent rudders double as spoilers/air brakes when both are actuated at the same time to their maximum 90° deflection. The reduced lift at the wingtips should normally cause a pitch up moment and should require a corrective elevon displacement. However, the spoiling action of the deflected rudders blanks out both horizontal stabilizers which results in an automatic compensation for the center of pressure forward shift.

Rudders are effective below stalling speeds of the overall aircraft. In fact, the rudders 94, 96 themselves, are never stalled out because of their respective wing tip locations and outboard motion into the free air stream. As a result, this aircraft has an excellent low speed maneuverability. Also, independent operation of the rudders, provides unusually good cross-wind landing characteristics. "Aerodynamic crabbing" is induced by deflecting the down wind rudder while the aircraft maintains the desired direction of landing with respect to a runway.

Turn stability is improved by the tip location of the rudders and yields an additional benefit in stabilizing the airplane during a turn. Due to speed and angle of flow difference between the inside and the outside wing, a moment is created around the vertical axis of the airplane. This moment is opposite to the direction of the turn and it may cause the so-called "Dutch roll" effect in a conventional swept wing airplane. However, this aircraft's tip location of the rudder introduces additional drag on the inside wing. This rudder drag balances the increased drag of the outside wing and tends to maintain a constant banking angle. When the banking angle increases, as due to a gust, the drag on the outside wing also increases which tends to roll the airplane out to the banking angle determined by the deflected inside rudder. Flight experience has proved this turn stability. This aircraft is circled in turbulent air at a preset banking angle without any corrective elevon action.

Lateral control and stability

Lateral stability of this aircraft is on the par with the stability of a comparable conventional airplane. The only exception is this aircraft's automatic recovery from "Dutch roll" due to the tip position of the rudders.

Lateral control can be exercised in either of two ways:
(a) by actuating the elevons, or
(b) by actuating a rudder.

Prolonged flights in this aircraft, in its glider embodiment, in steady circling in thermals, are made stick free, with rudders as the only control. Neither slipping nor skidding are experienced during the rudder-only induced and maintained turns.

POWERED AIRCRAFT

The powered aircraft 120, illustrated in FIGURES 7 through 10, is very similar in general appearance to the non-powered aircraft 20, illustrated in FIGURES 1 through 6.

The descriptions previously given apply equally well with respect to this powered aircraft and therefore they will not be said again. For this carry over purpose of such previous description, like numerals are used wherever possible to identify like or very near similar components. Again, all aerodynamic controls are in left and right groups located at swept back wing tips 62, 64 or nearby on trailing edges 44, 46.

In each of these wing tip groups there are: vertical stabilizers 86, 88; rudders 94, 96; horizontal stabilizers 74, 76; and elevons 66, 68 which are essentially arranged in the same manner and operated for the same purposes.

Preferably, tri-wheel 126 landing gear 128 will be secured to the underside of two place fuselage 130. Also, preferably, a shrouded 132, pushing propeller 134 will be located at the rear of fuselage 130. It will be driven by an engine, not shown, which will be favorably positioned in fuselage 130 where wings 136, 138 are joined together and to fuselage 130.

As so constructed and arranged the flight characteristics are similar to those discussed in regard to aircraft 20.

SAFETY AFFORDED THROUGH PLACEMENT AND OPERATION OF CONTROLS

In both illustrated aircraft 20 and 120 and others (not shown) where this wing tip and nearby trailing edge grouping of aerodynamic controls is utilized, their duplicity of functions and their independent functions underwrite a very substantial safety margin. Cable and rod controls are spaced through the wing interiors and their jamming is very unlikely. If, however, any jam did occur, the aircraft would still be controllable. This is true if any aerodynamic controls or their operational mechanisms were damaged or destroyed in flight, the aircraft would still be controllable. Only if one group of wing tip controls in their entirety were destroyed would the safety margin become critical and depending on the extent of destruction, there might not be any safety margin. It is to be remembered, however, that each control surface serves dual functions or more, for example, the rudder serving as a rudder, spoiler and air brake.

PAYLOAD EFFICIENCY

Because of the non-use of extended fuselage or equivalent structures, the comparative reduction in size of aerodynamic controls, as much as 50%, and other efficient use of structures and their cooperating relationships, the overall aircrafts 20, 120 are able to carry a comparatively much higher pay load. The absence of such extended and center line or near center aft positioned control and structure therefore, eliminates downward aerodynamic forces that would otherwise be generated by them to add to the bending moment of the wing, therefore aircrafts 20, 120 are made with comparative lighter wing structural assemblies. Also some relief in wing-bending moments is realized in aircrafts 20, 120 due to the weight of their wing tip controls.

The wing tip area grouping of aerodynamic controls wherein essentially all their locations and proportions are beneficial to the aerodynamic performance of the aircraft further underwrite the more favorable payload efficiency that is achieved. For examples, in cruise flight the vertical stabilizers and rudders are performing the beneficial endplate functions which reduce wing tip induced drag and the elevons and stabilizers are essentially part of the swept wings. So there is little specific drag lost to be chargeable against aerodynamic controls per se, and moreover the beneficial air flows derived result in positive cruise operational benefits.

Actual testing experience with aircraft 20 indicates the drag is about 30% lower than in what might be termed conventional non powered aircraft of the same competing class. Again, stated in another way, this is due to: (a) absence of the cross tail and of its supporting aft fuselage section, (b) location of controls on wing tips in the undisturbed air stream, (c) significantly smaller control surfaces, and (d) no cross tail interference drag. These indicate that at higher speeds this drag reduction percentage will increase beyond 30%.

DUTCH ROLLS

The tendency of swept wing aircraft to try and to actually enter into Dutch rolls has previously always been a serious problem. In aircrafts 20, 120, the wing tip grouping of controls places the rudders 94, 96 so that the rudder on a lower wing may be deflected during banking to equalize the drag across both wings by creating an additional balancing drag which forestalls any tendency of a Dutch roll occurrence.

SUMMARY

Aircraft having swept wings and these grouping of wing tip and trailing edge near wing tip mounted aerodynamic controls are flown more efficiently without any compromise in safety margins. The wing tip location of these flight controls and the resulting unloading of the wing bending moment, offer an attractive drag and weight reduction. As indicated previously, the safety margins and the improvements in efficiencies of controls are remarkably increased.

The alternating or dual capability of the controls is a major advance in such safety and these capabilities are derived without compromising the overall design. The opposite is true, they are derived while benefiting the overall design.

The formerly dreaded tumbling gyrations of flying wings designs are harnessed. The wing tip and near wing tip aerodyamic controls always remain fully effective and are successfully employed to initiate, the control, and to stop tumbling.

In regard to aircraft 20, by adding weight to its nose, the inertia moment may be increased, and as a result the tumbling rate, expressed in r.p.m's, may be increased. However, when this is occurring there is a corresponding increase in the controllability. In tumbling maneuvers effective use of the wing tip and near wing tip controls by the pilot is possible to stop the tumbling. The pilot has the capability of causing reversal of the tumbling direction by his over effective use of these controls.

This formula for tumble is offered:

$$M_i \gtreqless M_{AD} \pm M_{EL} \pm M_{hor.stab.} + M_{rudders}$$

where:

$M_i$=constant inertia moment
$M_{AD}$=constant wing aerodynamic damping moment
$M_{EL}$=changeable elevator damping moment
$M_{hor.stab.}$=changeable horizontal stabilizer damping moment
$M_{rudders}$=changeable rudder damping moment Changes in moments represented by the factors $M_{EL}$, $M_{hor.stab.}$ and $M_{rudders}$ can change the flight relationship from one state to another. These moments are effectively changeable because the aerodynamic controls are located at the wing tips or near by on these swept back wings and they are "flying" at all times during tumbling. Moreover, their effectiveness increases with the square of velocity they are experiencing during tumbling at a rate which is higher than the opposing rate increases associated with inertia and wing loadings. Therefore aircraft 20, 120 and the like using this combination of wing tip aerodynamic controls on swept wings are safely flown under all conditions, including the most demanding, for all flight purposes while realizing very substantial increases in efficiency for all flight operations.

I claim:
1. An aircraft comprising:
   (a) a fuselage;
   (b) swept back wings extending outwardly and rearwardly commencing at the fuselage in a contoured transition portion which is slightly less in length than the main structural portions of the fuselage, then reducing in width to a uniform cross sectional shape, terminating as the trailing edge is biased forwardly to reduce the wing tip cross section;

(c) horizontal stabilizers, each pivotally secured to the respective forwardly biased trailing edge of each swept back wing, each having the outboard edge in line with the wing tip, both being essentially parallel to the center line of the fuselage, and each having a third side biased from the trailing wing edge rearwardly and outwardly to join the outboard stabilizer edge thereby forming a triangular like control surface with a rearwardly pointed end over which air flows more effectively for control purposes as horizontal stabilizers and optionally as elevators.

(d) vertical stabilizers, each secured to the respective forward portions of the wing tips and extending above and below the wing until just before the wing tip terminates where the horizontal stabilizer is mounted, these vertical stabilizers therefor serving also as end plates to improve air flow over the swept wings;

(e) rudders, each pivotally secured to the respective wing tips where the horizontal stabilizer is mounted and when set substantially dead ahead, each rudder is an effective extension of the end plate initially established by the respective vertical stabilizer, each rudder has a portion extending rearwardly of its pivotal mounting alongside a portion of the horizontal stabilizer, each rudder also has a portion of lesser length extending forwardly of its pivotal mounting to overlap on a bias the trailing edge of the respective vertical stabilizer, such overlap of the rudder being inboard and therefore movement of the forward rudder portions are confined between wing tip headings to inboard headings and consequently the rearward rudder portions are confined between wing tip headings to outboard movements, therefore the left wing rudder is confined to left turn initiating movements and the right wing rudder is confined to right turn initiating movements, the over wing portions serving as spoilers when a rudder is independently operated and when both are operated the rudders serve together as air brakes.

(f) elevons, each pivotally mounted on respective wings within the overall wing contour near the trailing edge just inboard of the respective horizontal stabilizers and arranged for like elevator movements and for opposite aileron movements; and (g) means supported by the fuselage and wings to actuate the respective horizontal stabilizers, rudders and elevons.

2. An aircraft, as claimed in claim 1, wherein the vertical stabilizers and rudders when aligned at the wing tip are respectively pointed slightly inwardly for increasing directional stability of forward flight when the swept back aspects of the wings are of a lesser degree.

3. An aircraft, as claimed in claim 1, wherein a faired and tapered trailing fin concludes the fuselage at a location forward of the terminus of each horizontal stabilizer.

4. An aircraft, as claimed in claim 1, wherein the contoured transition portions between fuselage and the regular width wing portions of the swept back wings are made full at the leading edge and thinned gradually into the trailing edge.

5. An aircraft, as claimed in claim 1, comprising, in addition, a self propelling means therefore secured to the fuselage.

6. An aircraft, as claimed in claim 1, comprising, in addition, a landing means secured to the fuselage.

7. An aircraft comprising:
(a) a fuselage;
(b) swept back wings, each extending outwardly and rearwardly from their supporting places on the fuselage;
(c) horizontal stabilizers each pivotally secured to the trailing edges of the swept back wings at the wing tips to be operated primarily as horizontal stabilizers and secondarily as elevators;

(d) vertical stabilizers, each secured to respective portions of the wing tips and extending above and below the wing to serve also as endplates;
(e) rudders, each pivotally secured to respective wing tips, serving as an effective extension of the endplate initially established by the respective vertical stabilizers, extending in part rearwardly of its pivotal mounting and extending in part forwardly of its pivotal mounting, contacting with its forward portion the inboard side of the trailing edge of the respective vertical stabilizer, thereby confining the pivotal motions of the rudder portion between from forward headings to various inboard spoiler headings and thereby confining the rearward rudder portions from forward headings to various outboard rudder movements and, serving with the other rudder an air braking function; and
(f) elevons, each pivotally mounted on respective wings within the overall wing contour near the trailing edge just inboard of the respective horizontal stabilizers and arranged for like elevator movements and for opposite aileron movements.

8. In a swept wing aircraft all aeodynamic controls located on the wing tips and trailing edges near the wing tips, such controls comprising:
(a) horizontal stabilizers each pivotally secured to the trailing edges of the swept back wings at the wing tips to be operated primarily as horizontal stabilizers and secondarily as elevators;
(b) vertical stabilizers, each secured to respective portions of the wing tips and extending above and below the wing to serve also as endplates;
(c) rudders, each pivotally secured to respective wing tips, serving as an effective extension of the endplate initially established by the respective vertical stabilizers, extending in part rearwardly of its pivotal mounting and extending in part forwardly of its pivotal mounting, contacting with its forward portion the inboard side of the trailing edge of the respective vertical stabilizer, thereby confining the pivoting motions of the forward rudder portion from forward headings to various inboard spoiler headings and thereby confining the pivoting motion of the rearward rudder portions from forward headings to various outboard rudder movements and, serving with the other rudder an air braking function; and
(d) elevons, each pivotally mounted on respective wings within the overall wing contour near the trailing edge just inboard of the respective horizontal stabilizers and arranged for like elevator movements and for opposite aileron movements.

9. An aircraft, as claimed in claim 7, wherein the vertical stabilizers are secured in a slight toe in position to improve the directional stability of the aircraft.

10. In the controls of a swept wing aircraft, as claimed in claim 8, wherein the vertical stabilizers are secured in a slight toe in position to improve the directional stability of the aircraft.

11. In a swept wing aircraft all aerodynamic controls located on the wing tips and trailing edges near the wing tips, such controls comprising:
(a) vertical stabilizers, each secured to respective portions of the wing tips and extending above and below the wing to serve also as endplates positioned in a slight toe in direction;
(b) rudders, each pivotally secured to respective wing tips, serving as an effective extension of the endplate initially established by the respective vertical stabilizers, extending in part rearwardly of its pivotal mounting and extending in part forwardly of its pivot mounting, contacting with its forward portion the inboard side of the trailing edge of the respective vertical stabilizer, thereby confining the pivoting motions of the forward rudder portion from forward headings to various inboard spoiler headings and thereby confining the pivoting motions of the rearward rudder portion from forward headings to various outboard rudder movements, and serving with the other rudder an air braking function;

(c) horizontal stabilizers each pivotally secured to the trailing edges of the swept back wings at the wing tips, in a position wherein the forward portion of the respective rudder in pivoting from forward headings to various inboard spoiler headings interrupts the flow of air over the horizontal stabilizer, and in a position to serve as effective stabilizers creating pitch-up moments, as necessary, during straight away flight and to serve secondarily, as needed, as elevators; and (d) elevons, each pivotally mounted on respective wings within the overall wing contour near the trailing edge just inboard of the respective horizontal stabilizers and arranged for like elevator movements and for opposite aileron movements.

References Cited

UNITED STATES PATENTS

| | | | |
|---|---|---|---|
| 1,981,700 | 11/1934 | Hoffman | 244—35 |
| 2,474,585 | 6/1949 | Lloyd | 244—13 |
| 2,504,137 | 4/1950 | Lewis | 244—13 |

MILTON BUCKLER, *Primary Examiner.*

THOMAS W. BUCKMAN, *Assistant Examiner.*

U.S. Cl. X.R.

244—16, 35, 87, 91